uson8898777B1

(12) United States Patent
Oliver (10) Patent No.: US 8,898,777 B1
(45) Date of Patent: *Nov. 25, 2014

(54) SYSTEMS AND METHODS FOR DETECTING USER ACTIVITIES TO IDENTIFY DECEPTIVE ACTIVITY (75) Inventor: Ian Oliver, Manly Vale (AU)

(73) Assignee: Symantec Corporation, Mountain View, CA (US)

( * ) Notice: Subject to any disclaimer, the term of this patent is extended or adjusted under 35 U.S.C. 154(b) by 41 days.

This patent is subject to a terminal disclaimer.

(21) Appl. No.: 13/273,915

(22) Filed: Oct. 14, 2011

(51) Int. Cl.
*G06F 11/00* (2006.01)
*H04L 29/06* (2006.01)

(52) U.S. Cl.
CPC ......... *H04L 63/1433* (2013.01); *H04L 63/1441* (2013.01)
USPC .......................................................... 726/22

(58) Field of Classification Search
CPC ............ H04L 63/1425; H04L 63/1433; H04L 63/1441
USPC .......................................................... 726/22
See application file for complete search history.

(56) References Cited

U.S. PATENT DOCUMENTS

| | | | |
|---|---|---|---|
| 6,122,740 A * | 9/2000 | Andersen ........................... | 726/4 |
| 7,647,534 B2 * | 1/2010 | Castellani et al. ............... | 714/46 |
| 7,937,540 B2 * | 5/2011 | Sonoda et al. ................. | 711/154 |
| 7,975,292 B2 * | 7/2011 | Corella ............................. | 726/6 |
| 7,984,007 B2 * | 7/2011 | Reumann et al. ............... | 706/48 |
| 8,321,958 B1 * | 11/2012 | Fleming et al. ................. | 726/29 |
| 2003/0037251 A1 * | 2/2003 | Frieder et al. ................. | 713/200 |
| 2004/0064713 A1 * | 4/2004 | Yadav ............................. | 713/193 |
| 2004/0139186 A1 * | 7/2004 | Lee et al. ...................... | 709/223 |
| 2012/0054826 A1 * | 3/2012 | Asim et al. ......................... | 726/1 |
| 2012/0246702 A1 * | 9/2012 | Shepler et al. .................... | 726/4 |

OTHER PUBLICATIONS

Kellner, Mark A., Avoiding High-Priced 'Anti-Virus' Scam, The Washington Times, Aug. 31, 2011 (3 pgs.).
Liebowitz, Matt, How to Avoid 9/11 Anniversary Scams, SecuirtyNewsDaily, Aug. 29, 2011 (4 pgs.).
Website: http://ww.scamwatch.gov.au/content/index.phtml/tag/MobilePhoneScams, ScamWatch, Commonwealth of Australia 2011 (2 pgs.).

* cited by examiner

*Primary Examiner* — Mohammad W Reza
(74) *Attorney, Agent, or Firm* — Holland & Hart LLP (57) ABSTRACT

A computer-implemented method to determine whether user interaction activities are indicative of deceptive actions is described. Performance of at least one user interaction activity on a computing device is detected. The performance of the at least one user interaction activity is logged. A determination is made as to whether the logged user interaction activity matches a signature. A notification message is generated based on the determination that the logged user interaction activity matches the signature.

11 Claims, 10 Drawing Sheets

SYSTEMS AND METHODS FOR DETECTING USER ACTIVITIES TO IDENTIFY DECEPTIVE ACTIVITY

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many businesses use one or more computer networks to communicate and share data between the various computers connected to the networks. The productivity and efficiency of employees often require human and computer interaction. Users of computer technologies continue to demand an increase in the efficiency of these technologies. Improving the efficiency of computer technologies is desirable to anyone who uses and relies on computers.

Computing systems may be targets of attacks. For example, attackers may attempt to gain remote control of a computing system to extract sensitive information and data from the computing system. In some cases, a user of a computer system may unknowingly be the victim of such an attack. Attackers may impersonate a legitimate entity and trick the user into performing certain actions on the computing system. These actions may result in the user unknowingly granting the attackers access to the computing system. Once in control, the attackers may harvest sensitive information stored on the computing system, infect the system with malware, and the like. The sensitive information may include financial data, passwords, identification information, etc. As a result, the user's financial and personal information may be compromised. In addition, the user's computing device may be rendered infected and unable to perform.

SUMMARY

According to at least one embodiment, a computer-implemented method to determine whether user interaction activities are indicative of deceptive actions is described. Performance of at least one user interaction activity on a computing device may be detected. The performance of the at least one user interaction activity may be logged. A determination is made as to whether the logged user interaction activity matches a signature. A notification message may be generated based on the determination that the logged user interaction activity matches the signature.

In one embodiment, the determination as to whether the logged user interaction activity matches the signature may be initialized when an end point is detected. The end point may be a file download, initialization of a remote access session, or accessing a website requesting sensitive data. The user interaction activity may include an interaction between a user and the computing device.

In one configuration, the notification message may include a query to a user as to whether the user is currently engaged in a telephone call. A log that includes a past history of user interaction activities on the computing device may be analyzed to determine a frequency of occurrence of each user interaction activity. A score may be assigned to the detected at least one user interaction activity. The score may be based on the frequency of occurrence in the past of the at least one user interaction activity. The signature may include a sequence of at least one user interaction activity. In one configuration, the performance of an end point may be prevented until a determination is made as to whether the logged at least one user interaction activity matches the signature.

A computing device configured to determine whether user interaction activities are indicative of deceptive actions is also described. The computing device may include a processor and memory in electronic communication with the processor. The computing device may further include a deception identification module stored in the memory. The module may be configured to detect performance of at least one user interaction activity on a computing device, and log the performance of the at least one user interaction activity. The module may be further configured to determine whether the logged user interaction activity matches a signature, and generate a notification message based on the determination that the logged user interaction activity matches the signature.

A computer-program product to determine whether user interaction activities are indicative of deceptive actions is also described. The computer-program product may include a non-transitory computer-readable medium having instructions thereon. The instructions may include code programmed to detect performance of at least one user interaction activity on a computing device, and code programmed to log the performance of the at least one user interaction activity. The instructions may further include code programmed to determine whether the logged user interaction activity matches a signature, and code programmed to generate a notification message based on the determination that the logged user interaction activity matches the signature.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Anti-virus software may be used to prevent, detect, and remove malware, including, but not limited to, computer viruses, computer worms, Trojan horses, spyware, and adware. In some cases, however, a user may be a victim of an anti-virus scam. An anti-virus scam may include the user being contacted by a person that is impersonating a technical support person. The user may be contacted via phone, email, instant message, etc. The impersonator may inform the user that the user's computer may be infected with a virus, worm, and the like. Then, the impersonator may direct the user to a particular place on the user's computer that may display error messages or warnings. The displayed error messages or warnings, unbeknownst to the user, may be perfectly normal on a computer. The impersonator, however, may use the existence of these error messages or warnings as proof that the user's machine is infected.

In one example, the user may then give the impersonator remote access to his/her computer believing the impersonator will fix the problem. The impersonator may then actually infect the user's machine with spyware, viruses, etc. The impersonator may also gain access to sensitive information (e.g., bank account numbers, usernames, passwords, and the like). In addition, the impersonator may direct the user to a website that requests payment information from the user, such as a credit card number. This website may be under the control of the impersonator and once the credit card information is entered, the impersonator may gain access to the credit card information and cause financial damage to the user. Further, the user may be instructed by the impersonator to download a file to correct the displayed error messages or warnings. This file, however, may include a virus, spyware, a Trojan horse, etc. As a result, the user becomes the victim of an anti-virus scam. The present systems and methods may detect actions of the user to discern whether the user may be currently or potentially the victim of an anti-virus scam.

Figure 1:
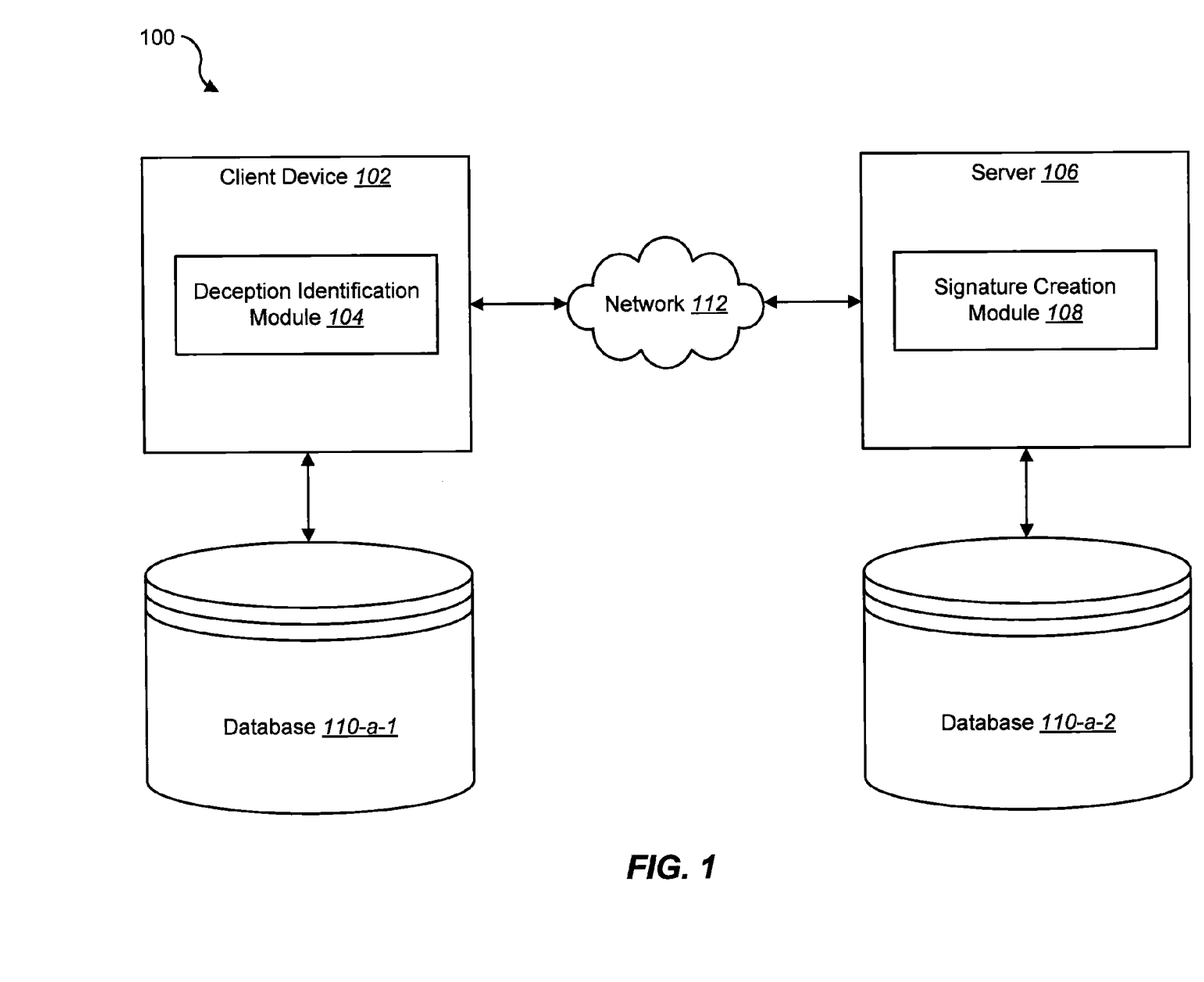
FIG. 1 is a block diagram illustrating one embodiment of an environment in which the present systems and methods may be implemented.

FIG. 1 is a block diagram 100 illustrating one embodiment of an environment in which the present systems and methods may be implemented. In one example, a client device 102 may communicate with a server 106 across a network 112 connection. The client device 102 may be a personal computer (PC), a laptop, a notebook, a tablet, a smartphone, or any other type of computing device. The client device 102 and the server 106 may each communicate with a database 110-a-1 and 110-a-2, respectively.

In one example, the database 110-a-2 in communication with the server 106 may store at least one signature. A signature may include a set of steps that a user may be asked to perform by someone wishing to deceive him/her. For example, a signature may include a set of user inaction activities that an impersonator may ask the user to perform during an anti-virus scam.

The server 106 may include a signature creation module 108. The module 108 may create signatures representing a set of activities the user has previously taken on the client device 102. The created signatures may be stored in the database 110-a-2.

In one configuration, the database 110-a-1 in communication with the client device 102 may store signatures received from the server 106. The client device may include a deception identification module 104. The module 104 may identify user interaction activities performed by the user of the client device 102. The module 104 may compare the identified activities with the signatures stored in the database 110-a-1. If the set of activities performed by the user match a stored signature, the deception identification module 104 may generate an alert to the user indicating the possibility that he/she is being deceived. Details regarding the deception identification module 104 will be described below.

Figure 2:
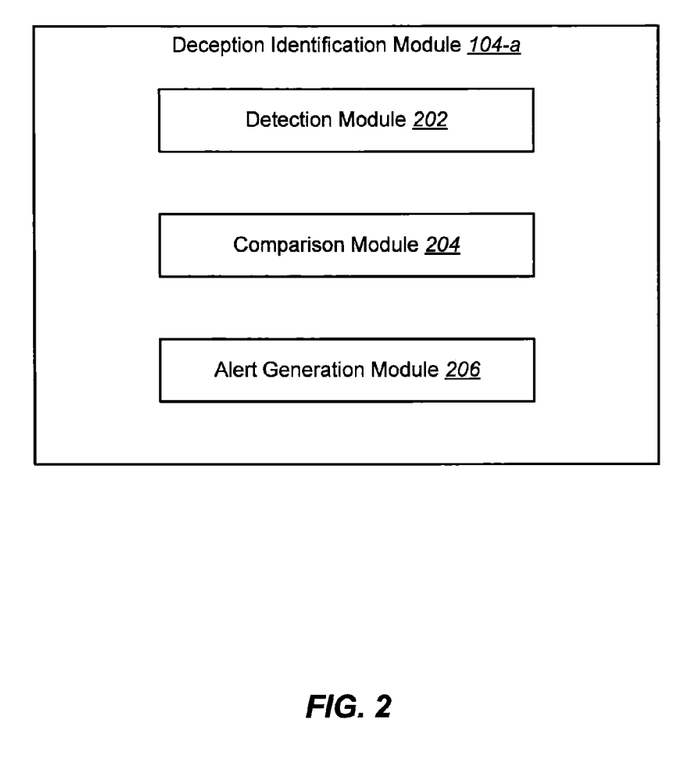
FIG. 2 is a block diagram illustrating one embodiment of a deception identification module.

FIG. 2 is a block diagram illustrating one embodiment of a deception identification module 104-a. The module 104-a may be an example of the module 104 of FIG. 1. In one configuration, the deception identification module 104-a may include a detection module 202, a comparison module 204, and an alert generation module 206. In one example, the detection module 202 may monitor the client device 102 to detect activities performed by the user. These activities may include, but are not limited to, selecting the "start" menu if the client device 102 is running a Windows® operating system, selecting the "run" command from the start menu, selecting a particular application to execute, etc. The detection module 202 may also detect when other activities may occur, such as, but not limited to, the downloading of a file, the initialization of a remote access session, the accessing of a particular website that requests payment information, and the like.

In one configuration, the comparison module 204 may compare the sequence of user interaction activities that have been detected by the detection module 202 against signatures stored in the database 110-a-1. As described above, the signatures may be received from the server 106. Each signature may represent a series of user interaction activities in a particular sequence. The alert generation module 206 may generate an alert to the user based on the comparison module 204 determining that actions detected by the detection module 202 match a signature.

Figure 3:
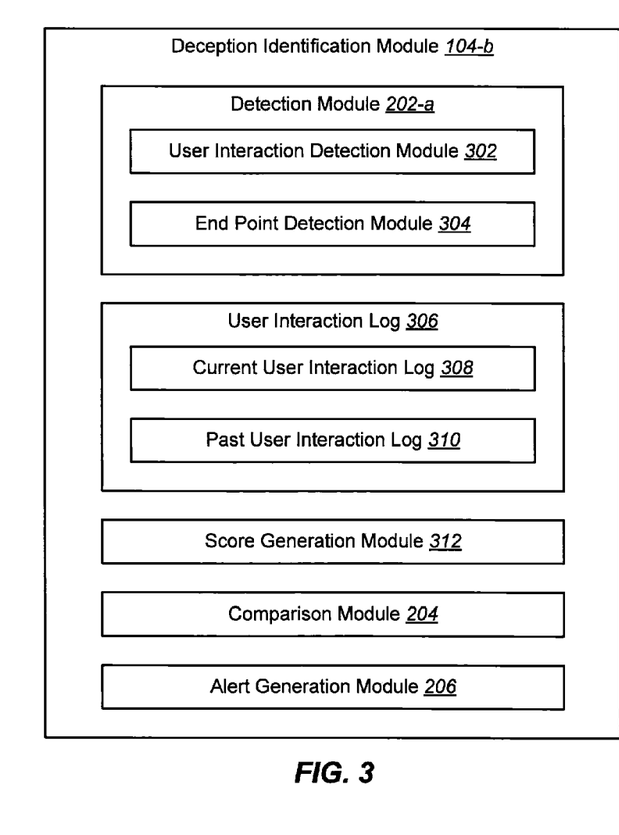
FIG. 3 illustrates one configuration of the deception identification module.

FIG. 3 illustrates one embodiment of a deception identification module 104-b. The module 104-b may be an example of the deception identification module 104 of FIG. 1 or 2.

The module 104-b may include a detection module 202-a, which may be an example of the detection module 202 of FIG. 2. In one configuration, the detection module 202-a may include a user interaction detection module 302 and an end point detection module 304. In one embodiment, the user interaction detection module 302 may monitor the client device 102 and detect interactions between the user and the device 102. The end point detection module 304 may detect the occurrence of a particular activity. For example, the end point detection module 304 may detect when a file is being downloaded to the client device 102, when a remote access session is granted by the client device 102, when a web browser executing on the client device 102 accesses a certain type of website, such as a website that requests payment information, and the like.

The deception identification module 104-b may further include a user interaction log 306. The log 306 may include a current user interaction log 308 and a past user interaction log 310. The current user interaction log 308 may be a log of activities performed by the user during a current session at the client device 102. These activities may be detected by the detection module 202-*a*. When the current session is terminated, the current user interaction log 308 may be cleared and emptied. The past user interaction log 310 may be a log of activities executed by the user during the current session as well as activities performed during past sessions. In other words, the past user interaction log 310 may be an ongoing history of user interaction steps taken by the user on the client device 102.

The deception identification module 104-*b* may further include a score generation module 312. The module 312 may analyze a particular activity performed by the user and assign a score or weight factor to the activity. The assigned score may represent how unusual or suspicious the particular activity may be. For example, if the user performs an activity that the user has not performed before (using the past user interaction log 310), the score generation module 312 may generate a score that represents the unusualness of the activity.

In one configuration, the deception identification module 104-*b* may also include a comparison module 204 and an alert generation module 206. The comparison module 204 may compare the steps included in the current user interaction log 308 with signatures received from the server 106. The comparison module 204 may be triggered to compare the current log 308 with the signatures each time the user interaction detection module 302 detects an activity performed by the user on the client device 102. In addition, the comparison may be triggered when the end point detection module 304 detects the performance of a particular end point (e.g., file download, initialization of a remote session, access of a website requesting payment information, etc.). Further, the comparison may be initialized when the user interaction module 302 detects a particular activity performed by the user. The alert generation module 206 may provide an informational alert to the user based on the results of the comparison.

The following provides an example of the deception identification module 104-*b* identifying the potential deception of the user based on the user's actions on the client device 102. In one example, the user may be contacted by a person purporting to be a technical support person for the user's client device 102. The user may be contacted through a phone call, an email, a text message, an instant message, and the like. For sake of clarity, the following is an example of the user receiving a phone call. During the call, the alleged technical support person may inform the user that his/her machine may be infected, vulnerable to attack, etc. The person may instruct the user to perform a certain sequence of actions. For example, the user may be instructed to click on the start menu button (if the client device 102 is using the Windows® operating system). If the user clicks on the start menu, the user interaction detection module 302 may detect this step and this step may be stored in the current user interaction log 308. The score generation module 308 may access the past user interaction log 310 to determine how often in the past the user has clicked the start menu. If the user has frequently performed this action in the past, the score generation module 308 may assign a relatively low score to this detected step indicating that the performance of this step is not that unusual by the user.

The person representing an alleged technical support person may continue to instruct the user to perform other activities. Each performed activity may be detected and logged in the current user interaction log 308. A score may also be assigned to each logged activity based on the past user interaction log 310. At any time during the detection of these activities (including the detection of an end point), the comparison module 204 may be triggered to compare the sequence of activities in the current user interaction log 308 against signatures received from the server 106. As explained above, each signature may represent a certain sequence of activities. If the activities in the log 308 match a signature, the alert generation module 206 may generate an alert to the user.

In one example, the alert may include a series of questions for the user to answer. For example, the alert may query the user as to whether the user is currently on the phone with a person claiming to be a technical support person. If the user answers in the affirmative, the alert may notify the user that he/she is possibly being deceived. The alert messages may include a certain confidence score based on the scores of the detected activities. For example, if the user performs steps A, B, and C and one or more of these steps are assigned a score that indicates a high level of unusualness, the alert message may indicate to the user that the confidence level that the user is being deceived is high. When the user receives an alert message, the user may choose to terminate the phone call, refuse to perform any future actions, obtain additional information about the person claiming to be a technical support person, etc.

Figure 4:
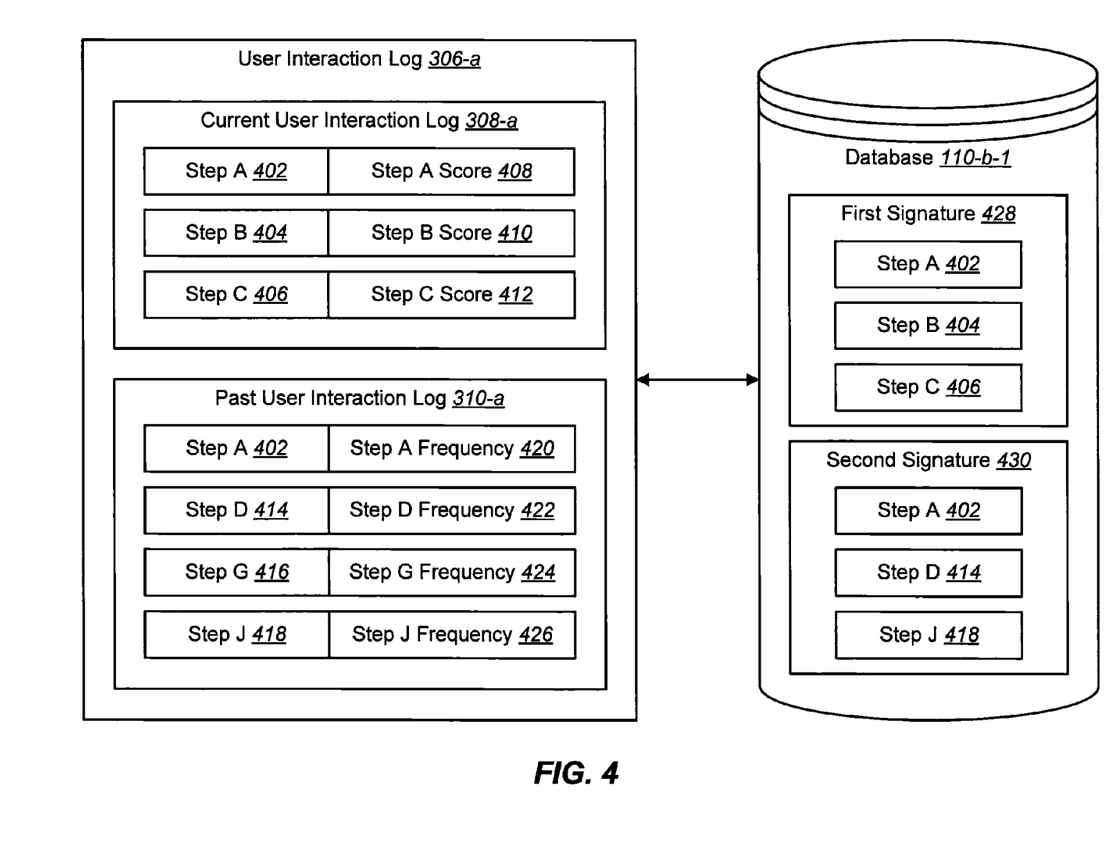
FIG. 4 is a block diagram illustrating one example of a user interaction log.

FIG. 4 is a block diagram illustrating one example of a user interaction log 306-*a*. The log 306-*a* may be an example of the user interaction log 306 of FIG. 3. In one example, the user interaction log 306-*a* may be in communication with a database 110-*b*-1, which may be an example of the database 110-*a*-1 of FIG. 1.

In one configuration, the database 110-*b*-1 may store one or more signatures. For example, the database 110-*b*-1 may store a first signature 428 and a second signature 430. Each signature 428, 430 may represent a certain sequence of steps or activities a user may perform on the client device 102. For example, the first signature 420 may include step A 402, followed by step B 404, followed by step C 406. The second signature 430 may include step A 402, followed by step D 414, followed by step J 418. Each of the steps may be user interaction activities. In other words, each of the steps may be actions performed by a user of the client device 102. In addition, one or more of the steps may be an end point. For example, referring to the second signature 430, steps A and D may be user inaction steps while step J 418 represents a particular end point, such as a file download, a remote access session, a website requesting payment information, etc.

The user interaction log 306-*a* may include a current user interaction log 308-*a* and a past user interaction log 310-*a*. The current log 308-*a* may include a log of steps performed by the user during a current session at the client device 102. For example, the user may have performed step A 402, step B 404, and step C 406 during the current session. The past user interaction log 310-*a* may be a log of the steps the user has performed during previous sessions at the client device 102. In one embodiment, each step logged in the past user interaction log 310-*a* may include a frequency indicator. For example, step A 402 may be included in the past log 310-*a* because the user has previously performed step A 402. Linked to step A 402 may be a step A frequency 420. The frequency 420 may be dynamic and may indicate how often the user has performed step A 402 in the past. As a result, when the user performs step A 402 during the current session, step A 402 may be logged in the current log 308-*a* and the step A frequency 420 in the past log 310-*a* may be updated.

A score may be linked to the performance of step A 402 in the current log 308-*a*. The score may indicate how unusual it is that the user is performing step A 402 during the current session. If the step A frequency 420 is low, the score 408 in the current log 308-a may represent that it is unusual for the user to perform step A 402.

As illustrated, the current log 308-a may indicate that the user has performed steps A, B, and C. In the past, the user may have performed steps A, D, G, and J, as indicated by the past user interaction log 310-a. As a result, the scores for steps B and C may indicate that it is more unusual for the user to perform steps B and C than step A, because the user has not performed steps B and C in the past.

In one configuration, the sequence of steps in the current log 308-a may be compared with the signatures 428, 430 stored in the database 110-b-1. In this example, the sequence of steps in the current log 308-a may match the first signature 428. As a result, an alert may be generated and provided to the user that notifies the user that the user is currently being deceived. For example, step A 402 may be the step of clicking on the start menu, step B 404 may be step of selecting "run" from the start menu, and step C 406 may be the step of entering "EventViewer" in the data field of the "run" command. This sequence of steps may be unusual for a user to perform (as indicated by the score of each step). As a result, the present systems and methods may discern whether the user is possibly being deceived based on a comparison of steps performed by the user to signatures representing steps that indicate known deceitful behavior.

Figure 5:
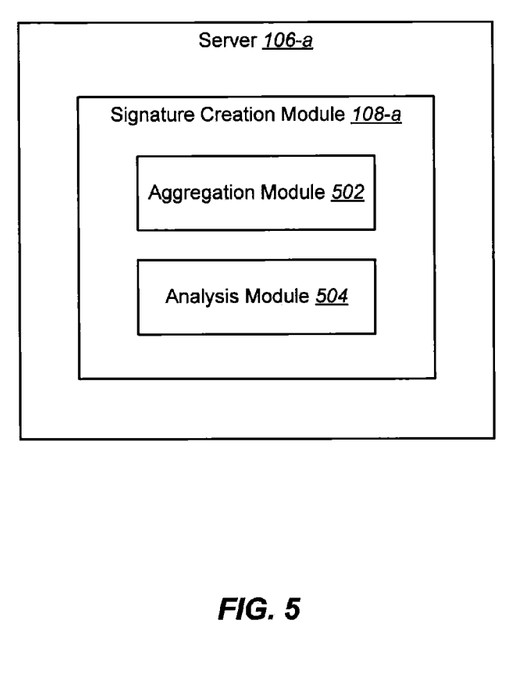
FIG. 5 is a block diagram illustrating one example of a server that may implement the present systems and methods.

FIG. 5 is a block diagram illustrating one example of a server 106-a, that may implement the present systems and methods. The server 106-a may be an example of the server 106 of FIG. 1. In one embodiment, the server 106-a may include a signature creation module 108-a. The module 108-a may include an aggregation module 502 and an analysis module 504.

The aggregation module 502 may aggregate user interaction activities performed by users on multiple client devices that do not match a previously generated signature. For example, a user on a first client device may perform the steps G, K, and M. These steps may be logged in the current log 308 of the first client device and compared against signatures received from the server 106-a. If the logged steps do not match a signature, the first client device may transmit data representing the performance of these steps to the server 106-a. The aggregation module 502 may aggregate each instance of the performance of steps received from various client devices. The analysis module 504 may analyze the aggregated data to determine whether a certain number of users are performing similar sequences of steps on their respective client devices. If the analysis module 504 identifies certain patterns of steps received from various client devices, the signature creation module 108-a may create a new signature representing the performance of these steps. This new signature may then be transmitted to the client devices. As a result, when a user next performs the steps G, K, and M, they may match a signature received from the server 106-a and an alert message may be generated indicating that the user is possibly being deceived. As threats and attacks are modified, the signatures may also be updated accordingly. For example, if it is determined that performing steps G, K, and O is indicative of deception, the signature may be updated to further include the performance of step O.

Figure 6:
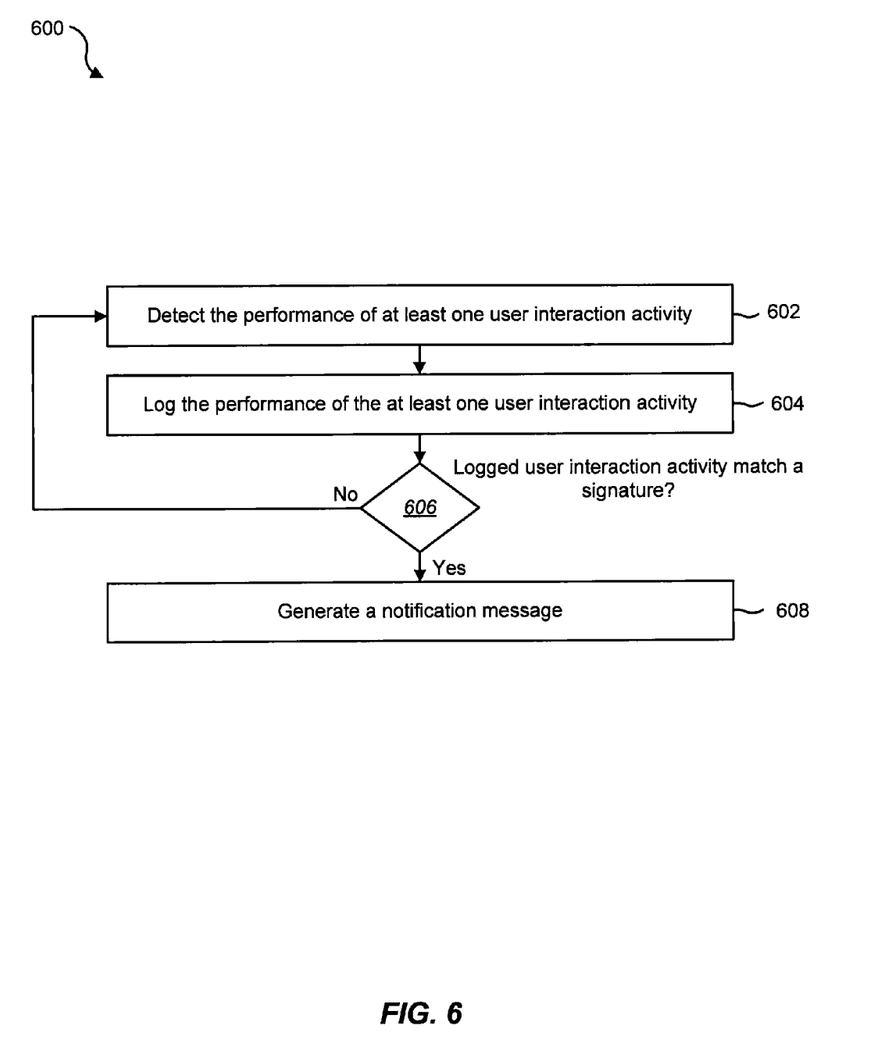
FIG. 6 is a flow diagram illustrating one embodiment of a method to discern whether user interaction activities are indicative of deception.

FIG. 6 is a flow diagram illustrating one embodiment of a method 600 to discern whether user interaction activities are indicative of deception. The method 600 may be implemented by the deception identification module 104 of FIG. 1, 2, or 3.

In one example, at block 602, the performance of at least one user interaction activity may be detected. At block 604, the performance of the at least one user interaction activity may be logged. At block 606, a determination may be made as to whether the logged user interaction activity matches a signature. If it is determined that the activity does not match a signature, the method 600 may return to block 602 to detect performance of user interaction activities. If, however, it is determined that the logged activity does match a signature, at block 608, a notification message may be generated. The message may query the user as to whether the user is currently on the phone with someone claiming to be a technical support person, whether the user is following steps outlined in an email received from an alleged technical support entity, and the like. If the user answers in the affirmative, the message may inform the user that he/she is possibly being deceived.

As described above, one example of a deception may include the user being asked to follow the steps, a) Click on "Start" and then select "Run" b) On the Run field, enter "EventViewer" c) Open a browser and access a website for remote access. Accessing "EventViewer" may display a log of events that have occurred on the user's machine. This log may naturally include several error messages or warnings that are on a computing device. An impersonator, however, may instruct the user to open EventViewer and then use the display of error messages as proof that the user's machine is possibly infected. A user that does not comprehend the purpose of such logs, such as EventViewer, a prefect folder, etc., may view the error messages and believe the person impersonating a technical support person.

The user may be asked to open a web browser to access a malicious website masquerading as a good website to initialize a remote access session. Instead, the website may include a virus, worm, Trojan, etc. If the user follows these steps, the person that contacted the user may then have access to their machine and may steal sensitive information, infect their computer, and the like.

As explained above, the signatures may represent flows of action, such as steps a)-c) described above. In one example, the SetWindowTitle for defined processes may be monitored for these sequences of actions. Once, for example, the first step (e.g., step (a)) begins the actions of the user may be monitored to check to see if the steps in the context are fulfilled within a certain time frame and without a certain amount of deviation.

To detect if an accessed website allows for remote access sessions to initialize, content keywords, title keywords, uniform resource locators (URLs) of websites registered to previous offenders, known good remote login websites, etc. may be stored. Further, if the user provides payment information (such as a credit card number on a website), the transmission of this data may be blocked until the user agrees that the data is to be transmitted. If the establishment of a remote session is attempted, this may be suspended until the current actions of the user may be compared against a signature.

Figure 7:
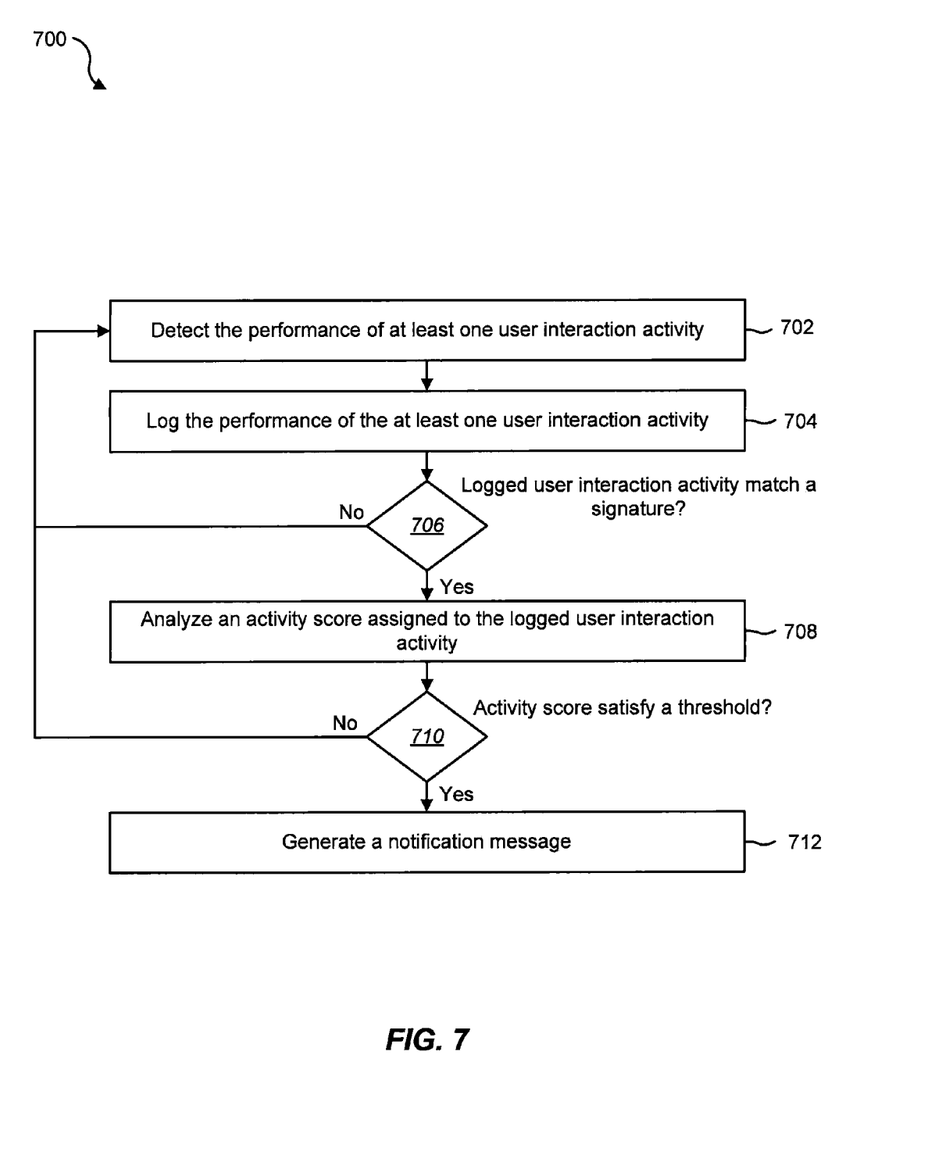
FIG. 7 is a flow diagram illustrating one example of a method to determine whether actions performed by a user indicate the user is being deceived.

FIG. 7 is a flow diagram illustrating one example of a method 700 to determine whether actions performed by a user indicate the user is being deceived. The method 700 may be implemented by the detection identification module 104 of FIG. 1, 2, or 3.

At block 702, the performance of at least one user interaction activity may be detected. At block 704, the performance of the at least one user interaction activity may be logged. At block 706, a determination may be made as to whether the logged user interaction activity matches a signature. If it is determined that the activity does not match a signature, the method 700 may return to detect the performance of user interaction activities. If, however, it is determined that the logged activity matches a signature, at block 708, an activity score assigned to the logged user interaction activity may be analyzed. At block 710, a determination may be made as to whether the activity score satisfies a threshold. For example, the user may perform a sequence of steps that match a signature, but the user may frequently perform these steps. As a result, the scores assigned to each step may be relatively low indicating that the likelihood of the user being deceived by performing these steps is also relatively low. If it is determined that the score does not satisfy the threshold (likelihood of deceit is low), the method 700 may return to detect the performance of user interaction activities. If, however, it is determined that the activity score does satisfy a threshold, at block 712, a notification message may be generated and presented to the user. The content of the message may vary depending on the activity score assigned to the user interaction activity. For example, if the score indicates a high likelihood of deceit, the message may inform the user that there is a high possibility the user is being deceived.

Figure 8:
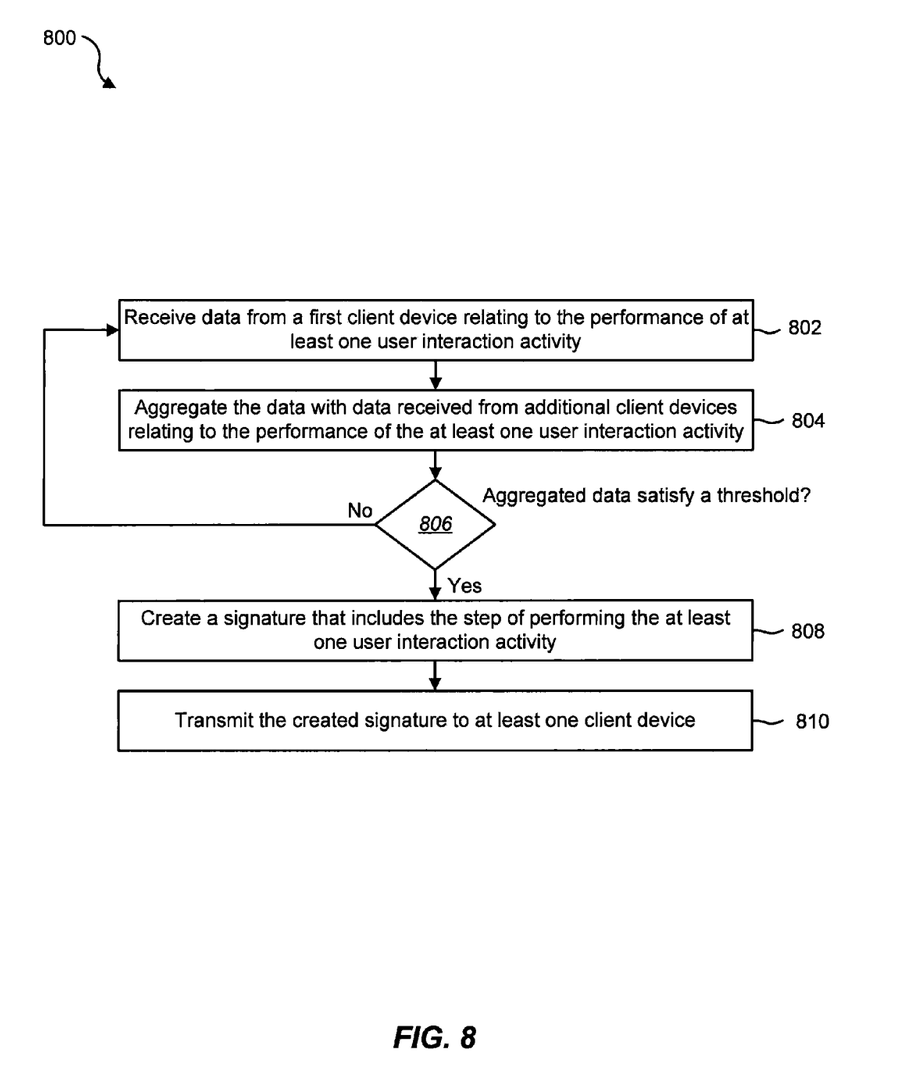
FIG. 8 is a flow diagram illustrating one example of a method to create a signature representing user interaction steps that may be indicative of deceitful behavior.

FIG. 8 is a flow diagram illustrating one example of a method 800 to create a signature representing user interaction steps that may be indicative of deceitful behavior. The method 800 may be implemented by the server 106 of FIG. 1 or 5.

At block 802, data may be received from a first client device relating to the performance of at least one user interaction activity. The activity may have been performed on the first client device. At block 804, the data may be aggregated with data received from additional client devices relating to the performance of the at least one user interaction activity. At block 806, a determination may be made as to whether the aggregated data satisfy a threshold. If the aggregated data do not satisfy the threshold, the method 800 may return to receive data from the client devices. If, however, it is determined that the aggregated data do satisfy the threshold, at block 808, a signature may be created. The signature may include the step of performing the at least one user interaction activity. At block 810, the created signature may be transmitted to at least one client device.

Figure 9:
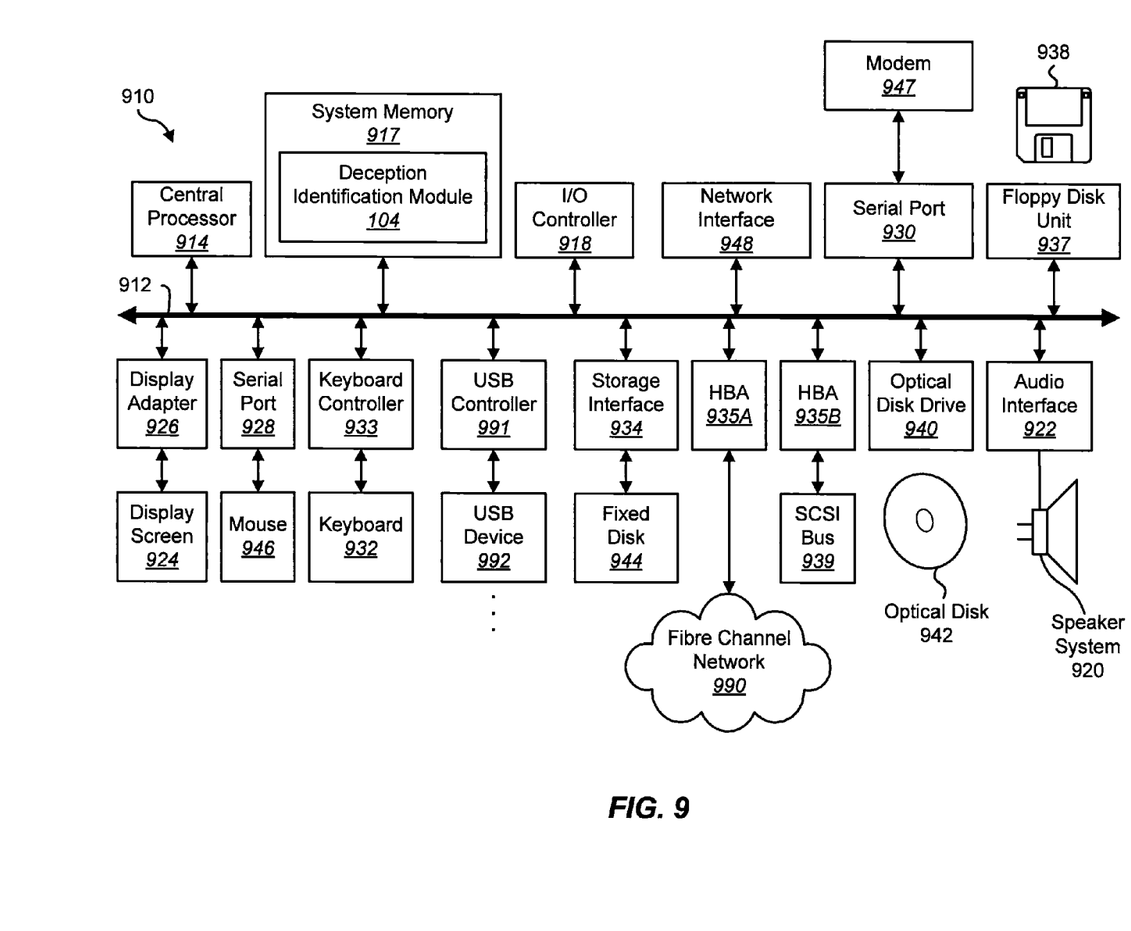
FIG. 9 depicts a block diagram of a computer system suitable for implementing the present systems and methods.

FIG. 9 depicts a block diagram of a computer system 910 suitable for implementing the present systems and methods. Computer system 910 includes a bus 912 which interconnects major subsystems of computer system 910, such as a central processor 914, a system memory 917 (typically RAM, but which may also include ROM, flash RAM, or the like), an input/output controller 918, an external audio device, such as a speaker system 920 via an audio output interface 922, an external device, such as a display screen 924 via display adapter 926, serial ports 928 and 930, a keyboard 932 (interfaced with a keyboard controller 933), multiple USB devices 992 (interfaced with a USB controller 991), a storage interface 934, a floppy disk unit 937 operative to receive a floppy disk 938, a host bus adapter (HBA) interface card 935A operative to connect with a Fibre Channel network 990, a host bus adapter (HBA) interface card 935B operative to connect to a SCSI bus 939, and an optical disk drive 940 operative to receive an optical disk 942. Also included are a mouse 946 (or other point-and-click device, coupled to bus 912 via serial port 928), a modem 947 (coupled to bus 912 via serial port 930), and a network interface 948 (coupled directly to bus 912).

Bus 912 allows data communication between central processor 914 and system memory 917, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the deception identification module 104 to implement the present systems and methods may be stored within the system memory 917. Applications resident with computer system 910 are generally stored on and accessed via a non-transitory computer readable medium, such as a hard disk drive (e.g., fixed disk 944), an optical drive (e.g., optical drive 940), a floppy disk unit 937, or other storage medium. Additionally, applications can be in the form of electronic signals modulated in accordance with the application and data communication technology when accessed via network modem 947 or interface 948.

Storage interface 934, as with the other storage interfaces of computer system 910, can connect to a standard computer readable medium for storage and/or retrieval of information, such as a fixed disk drive 944. Fixed disk drive 944 may be a part of computer system 910 or may be separate and accessed through other interface systems. Modem 947 may provide a direct connection to a remote server via a telephone link or to the Internet via an internet service provider (ISP). Network interface 948 may provide a direct connection to a remote server via a direct network link to the Internet via a POP (point of presence). Network interface 948 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 9 need not be present to practice the present systems and methods. The devices and subsystems can be interconnected in different ways from that shown in FIG. 9. The operation of a computer system such as that shown in FIG. 9 is readily known in the art and is not discussed in detail in this application. Code to implement the present disclosure can be stored in a non-transitory computer-readable medium such as one or more of system memory 917, fixed disk 944, optical disk 942, or floppy disk 938. The operating system provided on computer system 910 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 10:
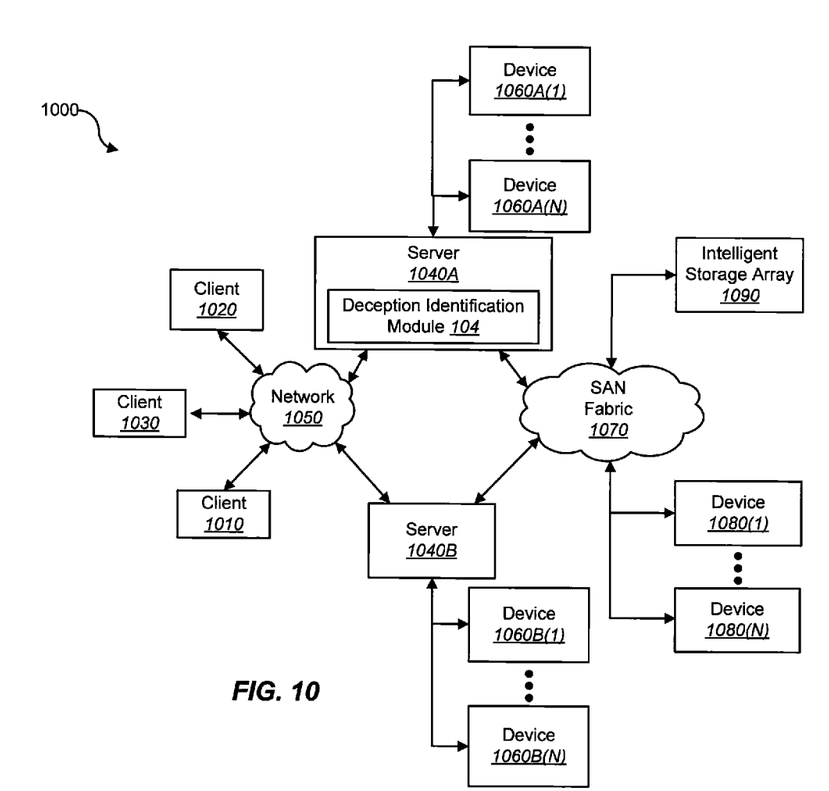
FIG. 10 is a block diagram depicting a network architecture in which client systems, as well as storage servers (any of which can be implemented using computer system), are coupled to a network.

FIG. 10 is a block diagram depicting a network architecture 1000 in which client systems 1010, 1020 and 1030, as well as storage servers 1040A, 1040B (any of which can be implemented using computer system 1010), are coupled to a network 1050. In one embodiment, the deception identification module 104 may be located within the storage servers 1040A, 1040B to implement the present systems and methods. The storage server 1040A is further depicted as having storage devices 1060A(1)-(N) directly attached, and storage server 1040B is depicted with storage devices 1060B(1)-(N) directly attached. SAN fabric 1070 supports access to storage devices 1080(1)-(N) by storage servers 1040A, 1040B, and so by client systems 1010, 1020 and 1030 via network 1050. Intelligent storage array 1090 is also shown as an example of a specific storage device accessible via SAN fabric 1070.

With reference to computer system 910, modem 947, network interface 948 or some other method can be used to provide connectivity from each of client computer systems 1010, 1020, and 1030 to network 1050. Client systems 1010, 1020, and 1030 are able to access information on storage server 1040A or 1040B using, for example, a web browser or other client software (not shown). Such a client allows client systems 1010, 1020, and 1030 to access data hosted by storage server 1040A or 1040B or one of storage devices 1060A (1)-(N), 1060B(1)-(N), 1080(1)-(N) or intelligent storage array 1090. FIG. 10 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method to determine whether user interaction activities are indicative of deceptive actions, comprising:
   detecting performance of at least one user interaction activity on a computing device in order to detect confidence scheme intrusions into the computing device, wherein the user interaction activity comprises a user receiving a request to grant a remote computing device access to the computing device;
   logging the performance of the at least one user interaction activity;
   analyzing a past history of the logged user interaction activities on the computing device to determine a frequency of occurrence of each user interaction activity;
   assigning a score to the detected at least one user interaction activity, wherein the score is based on the frequency of occurrence in the past of the at least one user interaction activity;
   determining whether the logged user interaction activity matches a signature, wherein the signature comprises a sequence of at least one user interaction activity; and
   generating a notification message based on the determination that the logged user interaction activity matches the signature, wherein the notification message comprises a query to the user of whether the user is in communication with another user and whether the other user is requesting that the user grant remote access to the computing device.

2. The method of claim 1, further comprising determining whether the logged user interaction activity matches the signature when an end point is detected.

3. The method of claim 2, wherein the end point comprises a file download, initialization of a remote access session, or accessing a website requesting sensitive data.

4. The method of claim 1, further comprising preventing the performance of an end point until a determination is made as to whether the logged at least one user interaction activity matches the signature.

5. A computing device configured to determine whether user interaction activities are indicative of deceptive actions, comprising:
   a processor;
   memory in electronic communication with the processor;
   instructions stored in the memory, the instructions being executable by the processor to:
      detect performance of at least one user interaction activity on a computing device in order to detect confidence scheme intrusions into the computing device, wherein the user interaction activity comprises a user receiving a request to grant a remote computing device access to the computing device;
      log the performance of the at least one user interaction activity;
      analyze a past history of the logged user interaction activities on the computing device to determine a frequency of occurrence of each user interaction activity;

assign a score to the detected at least one user interaction activity, wherein the score is based on the frequency of occurrence in the past of the at least one user interaction activity, determine whether the logged user interaction activity matches a signature wherein the signature comprises a sequence of at least one user interaction activity; and generate a notification message based on the determination that the logged user interaction activity matches the signature, wherein the notification message comprises a query to the user of whether the user is in communication with another user and whether the other user is requesting that the user grant remote access to the computing device.

6. The computing device of claim 5, wherein the instructions being executable by the processor to:

determine whether the logged user interaction activity matches the signature when an end point is detected.

7. The computing device of claim 6, wherein the end point comprises a file download, initialization of a remote access session, or accessing a website requesting sensitive data.

8. The computing device of claim 5, wherein the user interaction activity comprises an interaction between a user and the computing device.

9. The computing device of claim 5, wherein the instructions being executable by the processor to:

prevent the performance of an end point until a determination is made as to whether the logged at least one user interaction activity matches the signature.

10. A computer-program product to determine, via a processor, whether user interaction activities are indicative of deceptive actions, the computer-program product comprising a non-transitory computer-readable medium storing instructions thereon, the instructions being executable by the processor to:

detect performance of at least one user interaction activity on a computing device in order to detect confidence scheme intrusions into the computing device, wherein the user interaction activity comprises a user receiving a request to grant a remote computing device access to the computing device;

log the performance of the at least one user interaction activity;

analyze a past history of the logged user interaction activities on the computing device to determine a frequency of occurrence of each user interaction activity;

assign a score to the detected at least one user interaction activity, wherein the score is based on the frequency of occurrence in the past of the at least one user interaction activity, determine whether the logged user interaction activity matches a signature wherein the signature comprises a sequence of at least one user interaction activity; and generate a notification message based on the determination that the logged user interaction activity matches the signature, wherein the notification message comprises a query to the user of whether the user is in communication with another user and whether the other user is requesting that the user grant remote access to the computing device.

11. The computer-program product of claim 10, wherein the instructions are executable by the processor to:

determine whether the logged user interaction activity matches the signature when an end point is detected.

\* \* \* \* \*